(12) United States Patent
Lee et al.

(10) Patent No.: US 8,014,505 B2
(45) Date of Patent: Sep. 6, 2011

(54) POINT-OF-SALE ELECTRONIC PIN DISTRIBUTION SYSTEM

(75) Inventors: Johng Phil Lee, Teaneck, NJ (US); Eric E. Moon, London (GB); Sung H. Park, Fort Lee, NJ (US); Jung E. Lee, Burbank, CA (US); Aleksandr Livshits, East Hanover, NJ (US); Jae Heung Park, Fort Lee, NJ (US)

(73) Assignee: Locus Telecommunications, Inc., Englewood Cliffs, NJ (US)

( * ) Notice: Subject to any disclaimer, the term of this patent is extended or adjusted under 35 U.S.C. 154(b) by 1297 days.

(21) Appl. No.: 11/219,154

(22) Filed: Sep. 2, 2005

(65) Prior Publication Data

US 2007/0064891 A1 Mar. 22, 2007

(51) Int. Cl.
*H04M 15/00* (2006.01)

(52) U.S. Cl. .............................. 379/114.2; 379/114.15

(58) Field of Classification Search .. 379/114.15–114.2, 379/144.01, 207.13, 207.15, 88.02, 88.18, 379/88.19, 88.2, 91.01, 93.03, 93.12; 705/64, 705/21, 24, 26, 44
See application file for complete search history.

(56) References Cited

U.S. PATENT DOCUMENTS

| | | | |
|---|---|---|---|
| 4,359,631 A | 11/1982 | Lockwood et al. |
| 4,399,510 A | 8/1983 | Hicks |
| 4,567,359 A | 1/1986 | Lockwood |
| 4,775,784 A | 10/1988 | Stark |
| 4,783,064 A | 11/1988 | Hayashi |
| 4,818,854 A | 4/1989 | Davies et al. |
| 4,872,660 A | 10/1989 | Kameyama et al. |
| 4,877,947 A | 10/1989 | Mori |
| 4,908,761 A | 3/1990 | Tai |
| 4,951,308 A | 8/1990 | Bishop et al. |
| 5,076,562 A | 12/1991 | Sai et al. |
| 5,145,160 A | 9/1992 | Nagashima et al. |
| 5,146,067 A | 9/1992 | Sloan et al. |
| 5,156,385 A | 10/1992 | Muto et al. |
| 5,243,174 A | 9/1993 | Veeneman et al. |
| 5,250,789 A | 10/1993 | Johnsen |
| 5,285,382 A | 2/1994 | Muehlberger et al. |
| 5,299,796 A | 4/1994 | Wooldridge |
| 5,513,117 A | 4/1996 | Small |

(Continued)

FOREIGN PATENT DOCUMENTS

EP 0 406 841 A1 1/1991

(Continued)

OTHER PUBLICATIONS

U.S. Appl. No. 11/249,177, filed Oct. 11, 2005.

*Primary Examiner* — Quoc D Tran
(74) *Attorney, Agent, or Firm* — Greenberg Traurig, LLP

(57) ABSTRACT

A point-of-sale electronic distribution system for distributing an access code (e.g., a personal identification number (PIN)) is provided. The system allows retailers/distributors to purchase access codes for use with pre-paid products using conventional telephones and without requiring the use of a dedicated terminal or personal computer at the point-of-sale. A telephone call relating to a request for an access code is received at a central server. An access code is obtained from a database of access codes and transmitted to the caller by telephone, facsimile, or e-mail. Reports relating to a pre-paid calling card account can be requested during the telephone call.

24 Claims, 9 Drawing Sheets

U.S. PATENT DOCUMENTS

| | | | |
|---|---|---|---|
| 5,557,087 A | 9/1996 | Duyck | |
| 5,557,518 A | 9/1996 | Rosen | |
| 5,577,109 A | 11/1996 | Stimson et al. | |
| 5,578,808 A | 11/1996 | Taylor | |
| 5,621,787 A | 4/1997 | McKoy et al. | |
| 5,627,356 A | 5/1997 | Takemoto et al. | |
| 5,637,845 A | 6/1997 | Kolls | |
| 5,673,309 A | 9/1997 | Woynoski et al. | |
| 5,681,787 A | 10/1997 | Seamans et al. | |
| 5,684,291 A | 11/1997 | Taskett | |
| 5,687,087 A | 11/1997 | Taggart | |
| 5,696,908 A | 12/1997 | Muehlberger et al. | |
| 5,721,768 A | 2/1998 | Stimson et al. | |
| 5,722,067 A | 2/1998 | Fougnies et al. | |
| 5,778,313 A | 7/1998 | Fougnies | |
| 5,828,740 A | 10/1998 | Khuc et al. | |
| 5,845,259 A | 12/1998 | West et al. | |
| 5,850,217 A | 12/1998 | Cole | |
| 5,854,975 A | 12/1998 | Fougnies et al. | |
| 5,868,236 A | 2/1999 | Rademacher | |
| 5,883,810 A | 3/1999 | Franklin et al. | |
| 5,884,292 A | 3/1999 | Baker et al. | |
| 5,892,827 A | 4/1999 | Beach et al. | |
| 5,903,633 A | 5/1999 | Lorsch | |
| 5,970,469 A | 10/1999 | Scroggie et al. | |
| 5,980,011 A | 11/1999 | Cummins et al. | |
| 5,988,509 A | 11/1999 | Taskett | |
| 5,991,380 A | 11/1999 | Bruno et al. | |
| 5,991,749 A | 11/1999 | Morrill, Jr. | |
| 5,999,914 A | 12/1999 | Blinn et al. | |
| 6,000,832 A | 12/1999 | Franklin et al. | |
| 6,032,859 A | 3/2000 | Muehlberger et al. | |
| 6,035,025 A | 3/2000 | Hanson | |
| 6,050,493 A | 4/2000 | Fertig | |
| 6,081,791 A | 6/2000 | Clark | |
| 6,105,009 A | 8/2000 | Cuervo | |
| 6,149,055 A | 11/2000 | Gatto | |
| 6,152,029 A | 11/2000 | Templeton | |
| 6,155,487 A | 12/2000 | Dean et al. | |
| 6,169,975 B1 | 1/2001 | White et al. | |
| 6,269,343 B1 | 7/2001 | Pallakoff | |
| 6,308,887 B1 | 10/2001 | Korman et al. | |
| 6,318,536 B1 | 11/2001 | Korman et al. | |
| 6,402,039 B1 | 6/2002 | Freeman et al. | |
| 6,405,182 B1 | 6/2002 | Cuervo | |
| 6,431,537 B1 | 8/2002 | Meier | |
| 6,457,886 B1 | 10/2002 | Meier | |
| 6,497,359 B1 | 12/2002 | Chihara | |
| 6,513,710 B1 | 2/2003 | Haas | |
| 6,526,130 B1 * | 2/2003 | Paschini | 379/93.12 |
| 6,575,361 B1 | 6/2003 | Graves et al. | |
| 6,651,885 B1 | 11/2003 | Arias | |
| 6,659,259 B2 | 12/2003 | Knox et al. | |
| 6,688,740 B2 | 2/2004 | Driggers | |
| 6,827,260 B2 | 12/2004 | Stoutenburg et al. | |
| 6,973,172 B1 * | 12/2005 | Bitove et al. | 379/114.2 |
| 7,156,300 B1 | 1/2007 | Dentlinger | |
| 7,181,416 B2 | 2/2007 | Arias | |
| 7,255,268 B2 * | 8/2007 | Dentlinger | 235/380 |
| 7,260,396 B2 | 8/2007 | Balachandran et al. | |
| 7,280,644 B2 * | 10/2007 | Tamari et al. | 379/114.16 |
| 7,522,716 B2 | 4/2009 | Paschini | |
| 7,546,947 B1 | 6/2009 | Arias | |
| 2001/0023415 A1 | 9/2001 | Keil | |
| 2002/0032752 A1 | 3/2002 | Gold et al. | |
| 2002/0077973 A1 | 6/2002 | Ronchi et al. | |
| 2002/0121545 A1 | 9/2002 | Eguchi et al. | |
| 2002/0165820 A1 | 11/2002 | Anvekar et al. | |
| 2002/0188510 A1 | 12/2002 | Arias | |
| 2003/0106934 A1 | 6/2003 | McCall et al. | |
| 2003/0236755 A1 | 12/2003 | Dagelet | |
| 2004/0086098 A1 | 5/2004 | Craft | |
| 2004/0111322 A1 | 6/2004 | Arias | |
| 2004/0118914 A1 * | 6/2004 | Smith et al. | 235/380 |
| 2004/0122753 A1 | 6/2004 | Yap et al. | |
| 2005/0033684 A1 * | 2/2005 | Benedyk et al. | 705/39 |
| 2005/0178825 A1 | 8/2005 | Arias | |
| 2008/0270245 A1 * | 10/2008 | Boukadoum et al. | 705/17 |

FOREIGN PATENT DOCUMENTS

| | | |
|---|---|---|
| EP | 0 527 639 A2 | 2/1993 |
| EP | 0 627 714 A2 | 12/1994 |
| EP | 1 030 274 A1 | 8/2000 |
| EP | 1 297 500 A2 | 4/2003 |
| EP | 0627 714 B1 | 6/2003 |
| FR | 2 779 381 A1 | 12/1999 |
| GB | 2 338 814 A | 12/1999 |
| JP | 01261799 A | 10/1989 |
| JP | 11134539 A | 5/1999 |
| JP | 2000-99811 A | 4/2000 |
| KR | 2001-0074614 A | 8/2001 |
| WO | WO 95/12169 A1 | 5/1995 |
| WO | WO 96/38801 A1 | 12/1996 |
| WO | WO 96/41462 A1 | 12/1996 |
| WO | WO 97/30409 A2 | 8/1997 |
| WO | WO 98/47112 A1 | 10/1998 |
| WO | WO 98/47116 A1 | 10/1998 |
| WO | WO 99/23622 A1 | 5/1999 |
| WO | WO 99/25106 A2 | 5/1999 |
| WO | WO 99/62038 A1 | 12/1999 |
| WO | WO 00/79492 A1 | 12/2000 |
| WO | WO 01/43095 A2 | 6/2001 |
| WO | WO 01/91070 A2 | 11/2001 |
| WO | WO 01/91070 A3 | 11/2001 |
| WO | WO 01/95264 A2 | 12/2001 |
| WO | WO 01/95264 A3 | 12/2001 |

\* cited by examiner

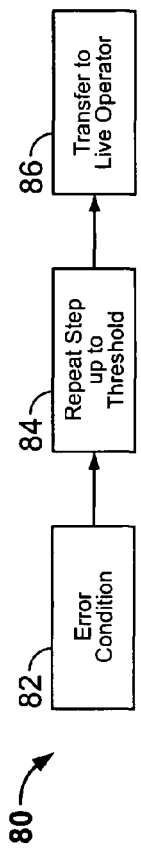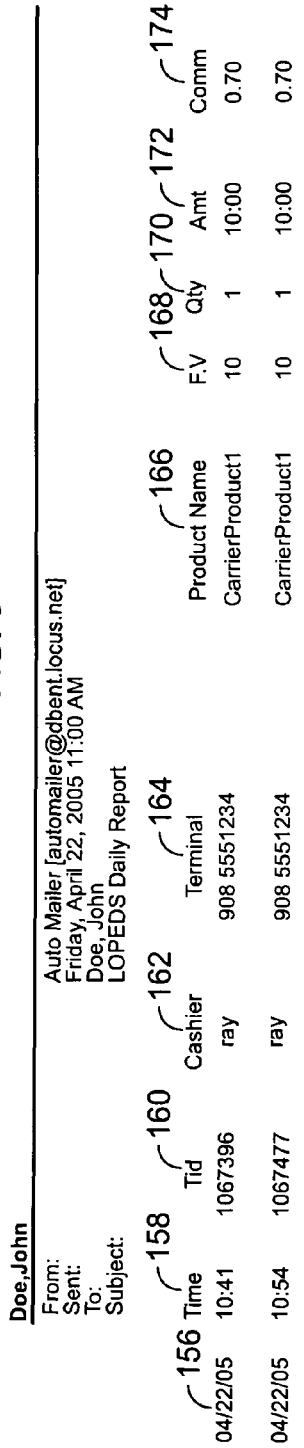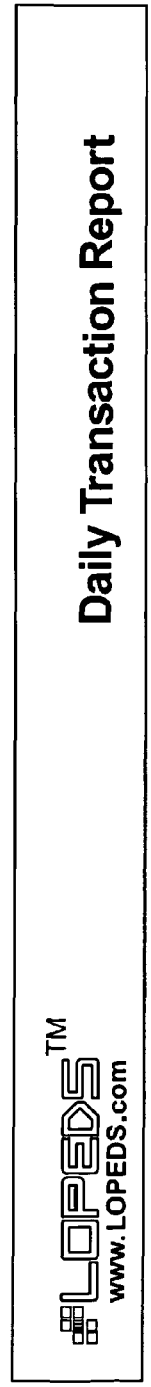
FIG. 8
FIG. 9
FIG. 10

Doe, John

From: Auto Mailer [automailer@dbent.locus.net]
Sent: Friday, April 22, 2005 10:18 AM
To: Doe, John
Subject: LOPEDS Assigned Product List

| 176<br>Product Name | 178<br>Product Code | 180<br>Face Value |
|---|---|---|
| CarrierProduct1 | 121 | 10 |
| CarrierProduct1 | 121 | 25 |
| CarrierProduct1 | 121 | 50 |
| CarrierProduct1 | 121 | 75 |
| CarrierProduct1 | 121 | 100 |
| CarrierProduct2 | 132 | 10 |
| CarrierProduct2 | 132 | 15 |
| CarrierProduct2 | 132 | 25 |
| CarrierProduct2 | 132 | 35 |
| CarrierProduct2 | 132 | 50 |
| CarrierProduct3 | 117 | 20 |
| CarrierProduct3 | 117 | 30 |
| CarrierProduct3 | 117 | 50 |
| CarrierProduct4 | 213 | 0 |
| CarrierProduct4 | 213 | 10 |
| CarrierProduct4 | 213 | 20 |
| CarrierProduct4 | 213 | 30 |
| CarrierProduct4 | 213 | 40 |
| CarrierProduct4 | 213 | 50 |
| CarrierProduct4 | 213 | 100 |
| CarrierProduct4 | 213 | 200 |
| CarrierProduct5 | 125 | 10 |
| CarrierProduct5 | 125 | 20 |
| CarrierProduct5 | 125 | 30 |
| CarrierProduct5 | 125 | 50 |
| CarrierProduct6 | 825 | 5 |
| CarrierProduct6 | 825 | 10 |
| CarrierProduct6 | 825 | 20 |
| CarrierProduct7 | 358 | 10 |
| CarrierProduct7 | 358 | 20 |
| CarrierProduct7 | 358 | 30 |
| CarrierProduct8 | 829 | 5 |
| CarrierProduct8 | 829 | 10 |
| CarrierProduct8 | 829 | 20 |
| CarrierProduct9 | 834 | 5 |
| CarrierProduct9 | 834 | 10 |
| CarrierProduct9 | 834 | 20 |
| CarrierProduct10 | 838 | 5 |
| CarrierProduct10 | 838 | 10 |
| CarrierProduct10 | 838 | 20 |

FIG. 11

POINT-OF-SALE ELECTRONIC PIN DISTRIBUTION SYSTEM

FIELD OF THE INVENTION

The present invention relates to a system and method for distributing services and, more particularly, to a system and method for allowing consumers/retailers/distributors to purchase pre-paid access codes (e.g., personal identification numbers or PINs) via conventional telephones without using a dedicated terminal or personal computer.

BACKGROUND OF THE INVENTION

Over the past few years, pre-paid cards, such as local and long distance phone cards, cellular phone cards, Internet access cards, metro cards, gas cards, gift cards, and debit cards, have become increasingly popular as a convenient way to pay for services and/or products. Pre-paid cards are similar in appearance to credit cards, but unlike credit cards, pre-paid cards allow products and services to be purchased before being used. By way of example, pre-paid phone cards can be purchased in selected denominations, such as $10, $20, $50, etc., which can correspond to, for instance, 30 minutes, 60 minutes, or 150 minutes of local or long-distance calling time, respectively. Thus, the holder of the card can use services or purchase goods at any period of time, within the allocated credit balance. For cellular phone and Internet access cards, for example, the holder can make local and long distance telephone calls or access the Internet until the allocated credit runs out.

The front of a pre-paid card typically displays some type of logo and graphic image along with its corresponding amount of denomination. On the back side of the card, usually, a card number and personal identification number (PIN), or username and password are provided under an opaque surface coating which hides the information. After scratching the coating away (e.g., using a coin or other object), the revealed codes may be entered or utilized.

A common mode of distributing pre-paid cards is through the use of self-service card vending machines placed at desired locations, such as locations where customers are likely to need to make local, regional, or long-distance calls. For example, these machines are frequently located at airports, convenience stores, college student centers, and near pay telephones. When the seller of the pre-paid cards is co-located with the vending machine, such as in a convenience store, the pre-paid card provider can provide the pre-paid card seller with a batch of PIN numbers, and will charge the card seller a fee for activating those PIN numbers. In current dispensing machines, the PIN numbers on the pre-paid cards are typically activated at the time they are placed in the dispenser, because most customers use the pre-paid service immediately upon purchasing the card. This means that the pre-paid card seller has to purchase a large inventory of activated PIN numbers well before the cards are sold, thereby requiring the expenditure of significant capital by the seller. Also, because the vending machines contain a large supply of cards, all with activated PIN numbers, the pre-paid card vending machines are an attractive target for theft.

One way of overcoming the drawbacks of using pre-paid card vending machines is to provide the seller with a "smart" transaction terminal. In this arrangement, the seller uses the terminal to retrieve PIN numbers from a remote central database to provide the PIN numbers to the customer. One such "smart" point-of-sale (POS) terminal is disclosed in U.S. Pat. No. 6,651,885 to Arias (hereinafter the "Arias '885 Patent").

The POS terminal disclosed in the Arias '885 Patent communicates with a remote server, which consults a database for assigning a PIN. The server communicates with the POS terminal to print out a credit/debit paper card or receipt with the PIN imprinted thereon. However, such Point-of-sale systems require the installation of equipment at the seller's location, which can be costly for the seller.

Accordingly, what would be desirable, but has not yet been provided, is a PIN distribution system that can be used at any location and does not require the installation of special equipment.

SUMMARY OF THE INVENTION

The present invention overcomes the disadvantages and shortcomings of the prior art discussed above by providing a system and method for distributing access codes (e.g., PINs) for use in conjunction with pre-paid products and/or services (collectively referred to hereinafter as "products"). The method includes the steps of connecting a telephone call originating from a telephone to a transaction processing system, the telephone call being initiated by a caller from the telephone; receiving a request from the caller for an access code associated with a pre-selected product; obtaining an access code from the transaction processing system in response to the request; and transmitting the obtained access code to the caller.

The system includes a transaction processing system having a database. The database includes a plurality of access codes, each of which is associated with a pre-selected telecommunications product. The transaction processing system is operative to be connected to a telephone call originating from a telephone, the telephone call being initiated by a caller from the telephone. The transaction processing system is also operative to receive a request from the caller for an access code associated with a pre-selected product, obtain an access code from the database in response to the request, and transmit the obtained access code to the caller.

The access code can be transmitted to the caller in one or more ways, such as by facsimile, e-mail, or telephonically by aurally conveying the access code to the caller during the telephone call. The caller can also request a report relating to a calling card account during the telephone call. The report can be transmitted to the caller by facsimile, e-mail, or aurally. By transmitting desired information using e-mail, facsimile, or telephonically, the present invention eliminates the need for installing dedicated equipment at a point-of-sale to obtain access codes.

Further features and advantages of the invention will appear more clearly on a reading of the following detailed description of an exemplary embodiment of the invention, which is given below by way of example only.

BRIEF DESCRIPTION OF THE DRAWINGS

For a more complete understanding of the present invention, reference is made to the following detailed description of an exemplary embodiment considered in conjunction with the accompanying drawings, in which:

FIG. 8 is a flow chart illustrating an error-handling procedure according to the present invention for handling unsuccessful prompts for user input;

FIG. 9 is a screen shot showing a sample transaction report generated by the system of FIG. 1;

FIG. 10 shows a facsimile version of the transaction report shown in FIG. 9; and FIG. 11 is a screen shot showing a sample e-mail report generated by the system of FIG. 1, which includes product codes and calling card denominations.

DETAILED DESCRIPTION OF THE INVENTION

The present invention relates to a point-of-sale electronic PIN distribution system. The system allows PIN numbers (i.e., access codes) to be distributed to customers at any desired location using conventional telephone lines, e-mail, or facsimile for accessing pre-paid services and/or products collectively referred to herein as "products" (e.g., telephone calling card services, Internet access cards, gift cards, and the like). PIN numbers can be distributed without requiring the installation or use of dedicated computer terminal equipment at the locations.

Figure 1:
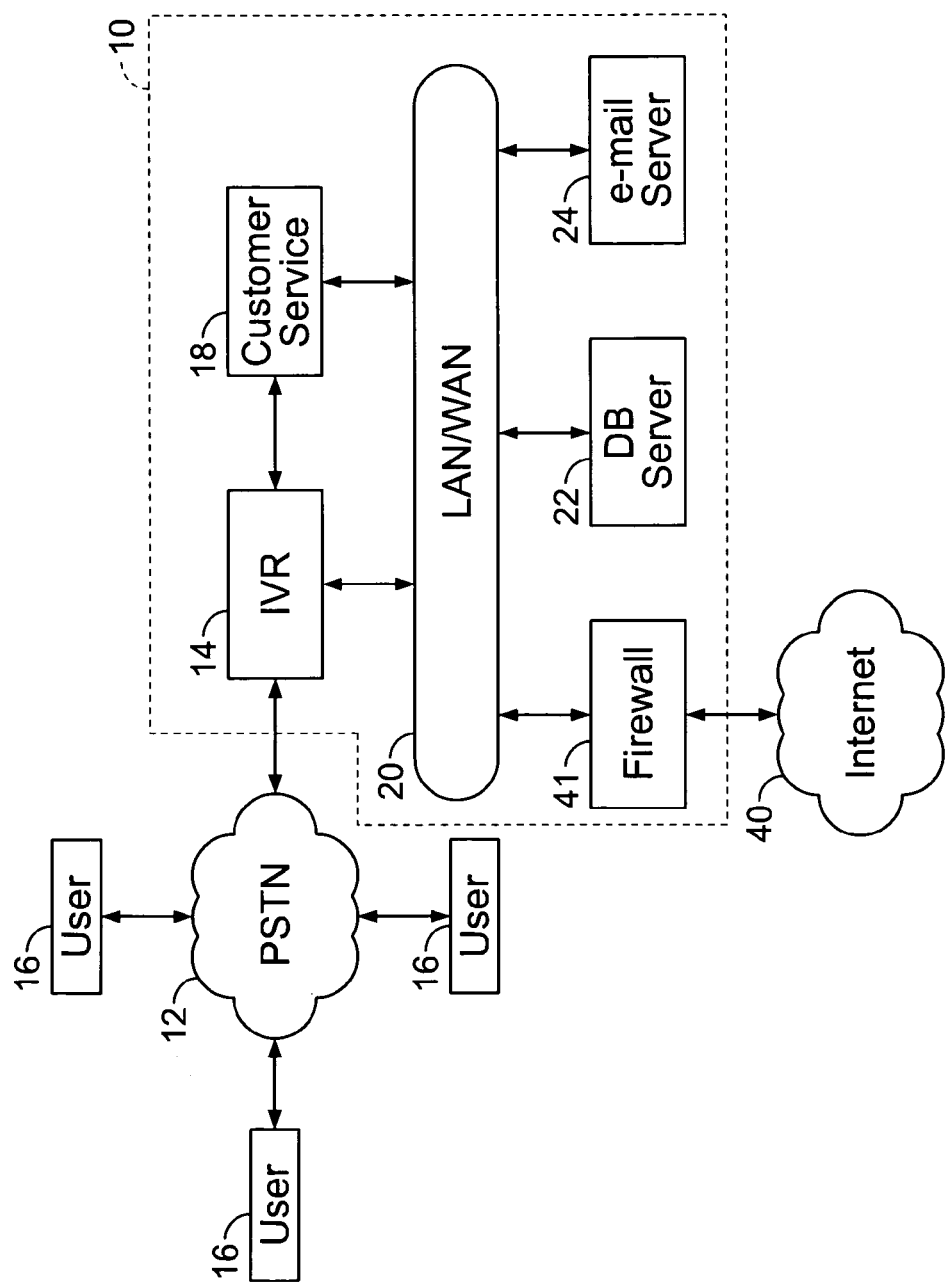
FIG. 1 is a schematic illustration of a PIN distribution system in accordance with an illustrative embodiment of the present invention.

Referring to FIG. 1, there is shown a PIN distribution system (i.e., a transaction processing system) according to the present invention, indicated generally at 10, for dispensing personal identification numbers (PINs). The system 10 could be used for distributing PINs (i.e., access codes) for use with services and/or products (e.g., telephone calling card services, Internet access cards, metro card, gas card, gift card, debit card, etc.). The system 10 is connected to a public switch telephone network 12 (hereinafter "the PSTN") via conventional telecommunication equipment, and includes an interactive voice response unit 14 (hereinafter "the IVR unit"). As is conventional in the telecommunication field, a user 16 interacts with the PSTN 12, such that the IVR unit 14 can be accessed from telecommunication devices (see FIG. 2) associated with the user 16. The IVR unit 14 is programmed to perform a number of automated customer service functions, such as PIN distribution, report generation, authentication, etc. More particularly, the IVR unit 14 has one or more suitable microprocessors running any suitable operating system and one or more suitable application programs. A customer service center 18 is connected to the IVR unit 14 via a local or wide area network (LAN/WAN 20) running any suitable network protocol, such as TCP/IP, so that customer service representatives can provide personal assistance to users of the PIN distribution system 10.

The PIN distribution system 10 is provided with servers which aid in the distribution of PINs. These servers include a database (DB) server 22, and an e-mail server 24. Each of the servers 22, 24 has one or more suitable microprocessors running any suitable operating system and one or more suitable application programs. Each of the servers 22, 24 is also connected to each other and to the IVR unit 14 via the LAN/WAN 20. It should be noted that the architecture disclosed in FIG. 1 need not be limited to the components depicted therein. Indeed, a single server, or any desired combination thereof, could be configured to provide the functionality of the present invention.

The database server 22 is provided for storing an account database containing PIN inventory and usage records, which will be discussed in greater detail hereinbelow. The database server 22 has one or more suitable microprocessors running any suitable operating system and one or more suitable application programs. Data can be transmitted between the IVR unit 14 and the database server 22 via the LAN/WAN 20 for the performance of automated customer service functions by the IVR unit 14. The database server 22 can respond to individual database queries using Structured Query Language (SQL) or other suitable database query language. Additionally, the database server 22 can provide a client/server interface to other servers on the LAN/WAN 20 for requesting one or more pieces of data with one or more operations known in the art as Stored Procedures (SP). Stored Procedures allow external servers, such as the IVR unit 14, to perform database queries without knowing the details of the structure of the tables and table formats stored in the database server 22. These Stored Procedures can perform a series of SQL query steps in a single invocation. The implementation of Stored Procedures is known to those skilled in the art of database programming.

The SPs can take the form of a function call, with zero or more input parameters and the name of the SP to be sent to the database server 22 from the invoking server, such as the IVR unit 14, over the WAN/LAN 20, and can be transmitted in the form of a message or as a remote procedural call. The database server 22 interprets the message or remote procedural call as instructions to invoke a server-side version of the requested SP using the supplied input parameters. The server-side SP makes one or more queries of the database server records using the supplied input parameters. If one or more of the queries is successful and the appropriate data is retrieved from the database server 22, then the server-side SP populates a result code field with a value indicating "success", usually defined as an integer of value "0". If one or more of the queries fails (e.g., if the data sought is not available), then the reason for the failure is returned in the result code field with a numerical value other than zero corresponding to a specific failure code. Any retrieved data is populated in the output parameters of the SP function call. Then a message is returned over the WAN/LAN 20 to the requesting server's client-side SP program, which now contains the result code and the output data parameters.

The e-mail server 24 can be integrated with the system 10, or it can be, for example, a pre-existing corporate-wide e-mail server connected to the WAN/LAN 20. Typically, such a server runs a standard e-mail program available from a number of manufacturers, which runs as an application on any suitable network protocol, such as TCP/IP. The e-mail server 24 is connected to the database server 22 and to the IVR unit 14 via the LAN/WAN 20. A firewall 41 could be provided for interconnecting the LAN/WAN 20 with the Internet 40 and to provide firewall protection capabilities.

Figure 2:
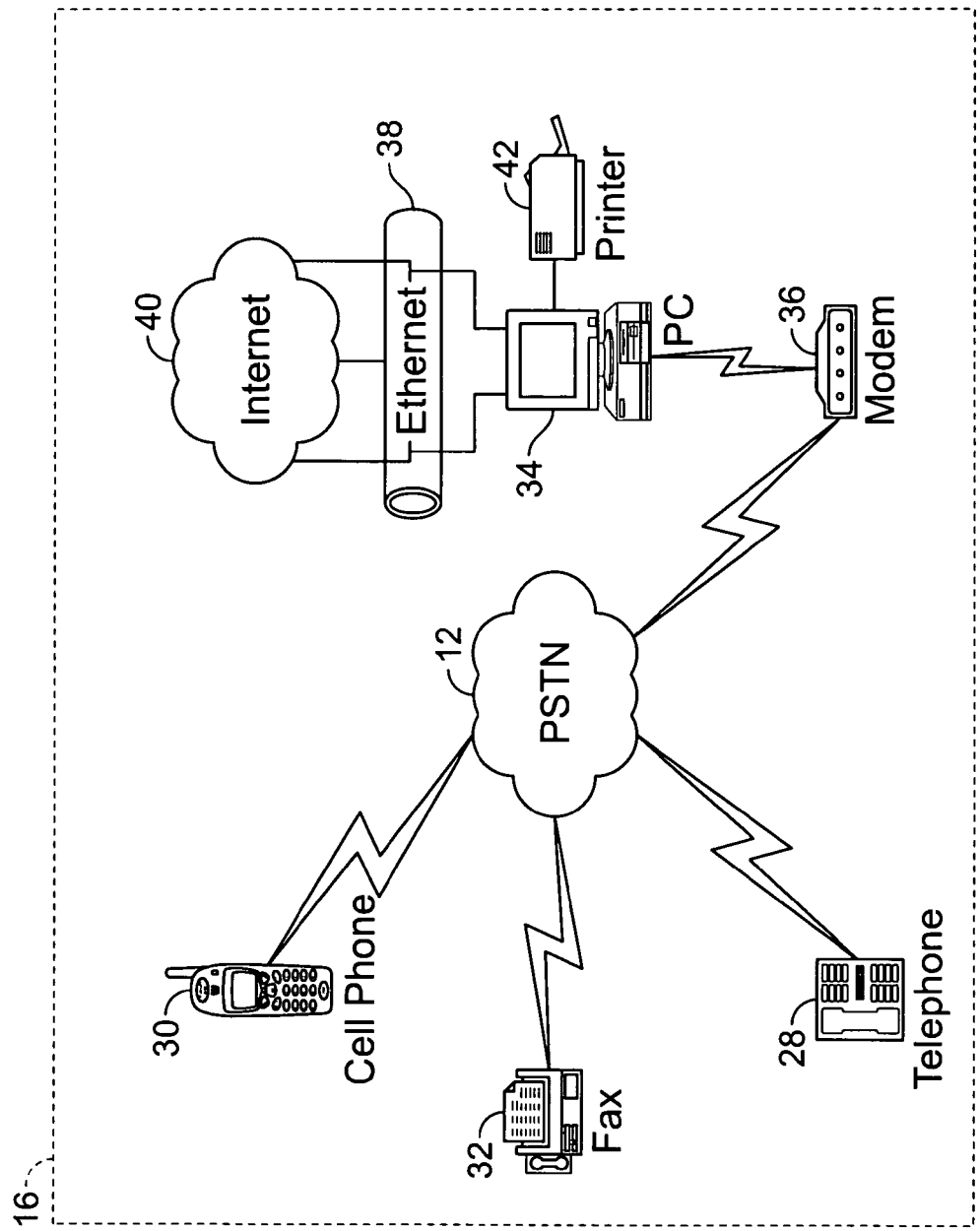
FIG. 2 is a schematic illustration of equipment employable by a user to interact with the system of FIG. 1.

Referring now to FIGS. 1 and 2, the user 16 can access the PIN distribution system 10 via the PSTN 12, using any suitable telecommunication devices, such as a private telephone 28 or a cellular phone 30. The user 16 can receive one or more PINs or transaction reports from the PIN distributing system 10 over the PSTN 12 via a fax machine 32. Optionally, the user 16 may receive one or more PINs and/or reports via e-mail, which would be accessible from a personal computer 34. The e-mail may be received at the personal computer 34 by direct connection to the PSTN 12 via a dial-up modem 36, or by indirect connection to the LAN/WAN 20 of FIG. 1 via an Ethernet card 38, which interfaces with the Internet 40 and the firewall 41 via broadband access (e.g., a high speed cable modem and network, or a digital subscriber line (DSL) and DSL modem). The user can obtain a hard copy of the e-mail containing the PIN or report by printing same on a printer 42. Optionally, the user 16 may receive one or more PINs and/or reports aurally via the IVR Unit 14.

The IVR unit 14 generates reports, which are requested by the user 16 via the telephone 28, the cell phone 30, or the personal computer 34. The IVR unit 14 is capable of dialing voice lines via the PSTN 12, and is also capable of transmission via facsimile over the PSTN 12 using a conventional fax server, which can be a component integrated with the IVR unit 14 or a component separate and independent from the IVR unit 14. To request a report, the IVR unit 14 invokes a client-based version of one of the stored procedures provided by the database server 22. As mentioned above, the SP takes the form of message or remote procedure call with appropriate input parameters, which message or remote procedure call is sent to the database server 22 via the LAN/WAN 20. The data to be reported, which may be, for example, a daily record of PIN purchases/transactions, a user's available credit, and a list of PIN product codes and denominations (e.g., code 110 from ABC Wireless Communications in denominations of $10, $20, etc.), is retrieved from the database server 22 over the LAN/WAN 20 and transferred to the IVR unit 14 as the output parameter of the invoked SP. The IVR unit 14 formats the report data into a form suitable for e-mail or facsimile, and then contacts and sends the formatted report to the user's personal computer 34 via the LAN/WAN 20, the e-mail server 24, and the Internet 40, and/or by facsimile to the user's fax machine 32 over the PSTN 12. The report could also be conveyed to the user 16 using text-to-speech conversion software in the IVR unit 14, so that the report can be read to the user 16.

Figure 3:
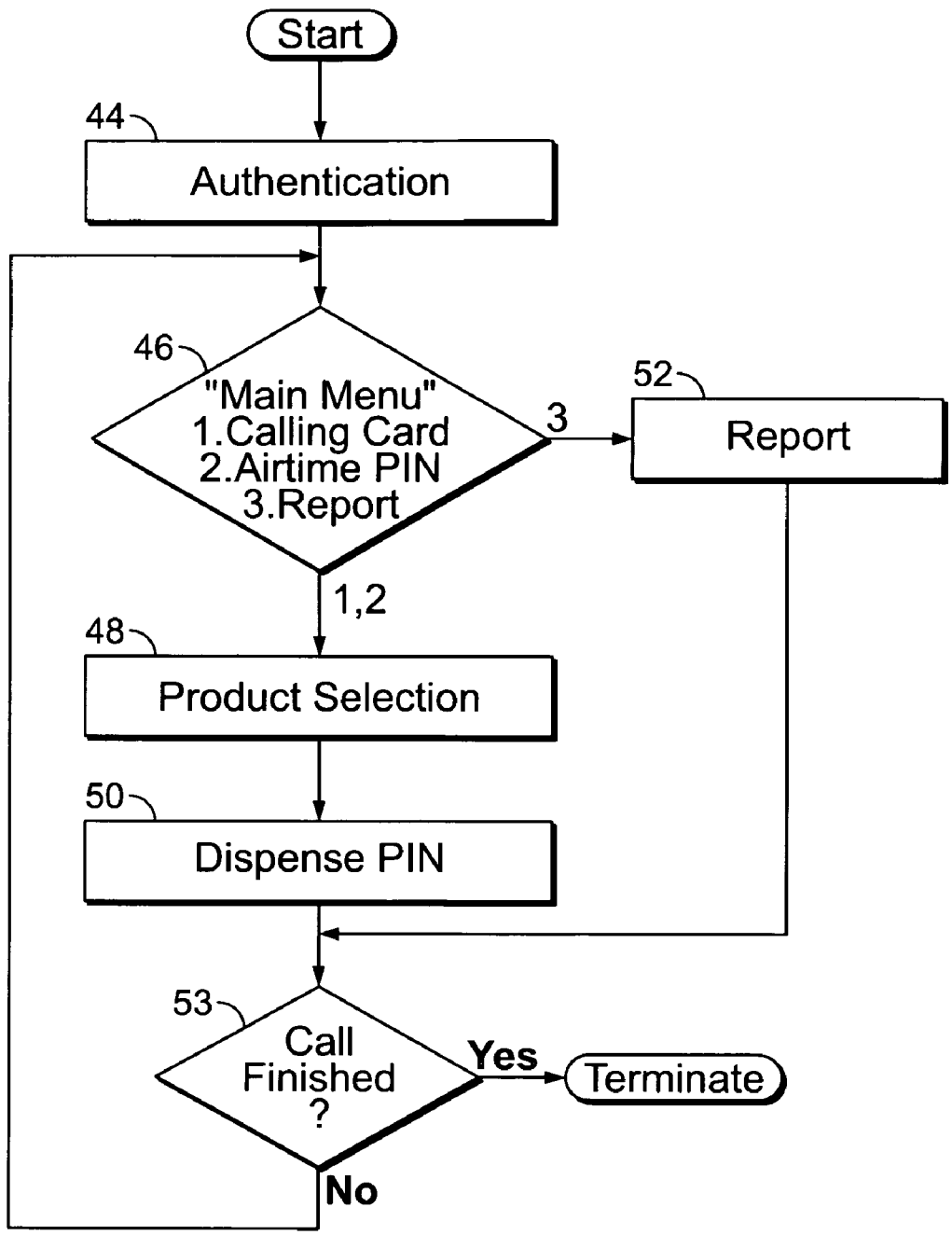
FIG. 3 is a high level flow chart showing a method according to the present invention for distributing access codes (e.g., personal identification numbers or PINs)
Figure 4:
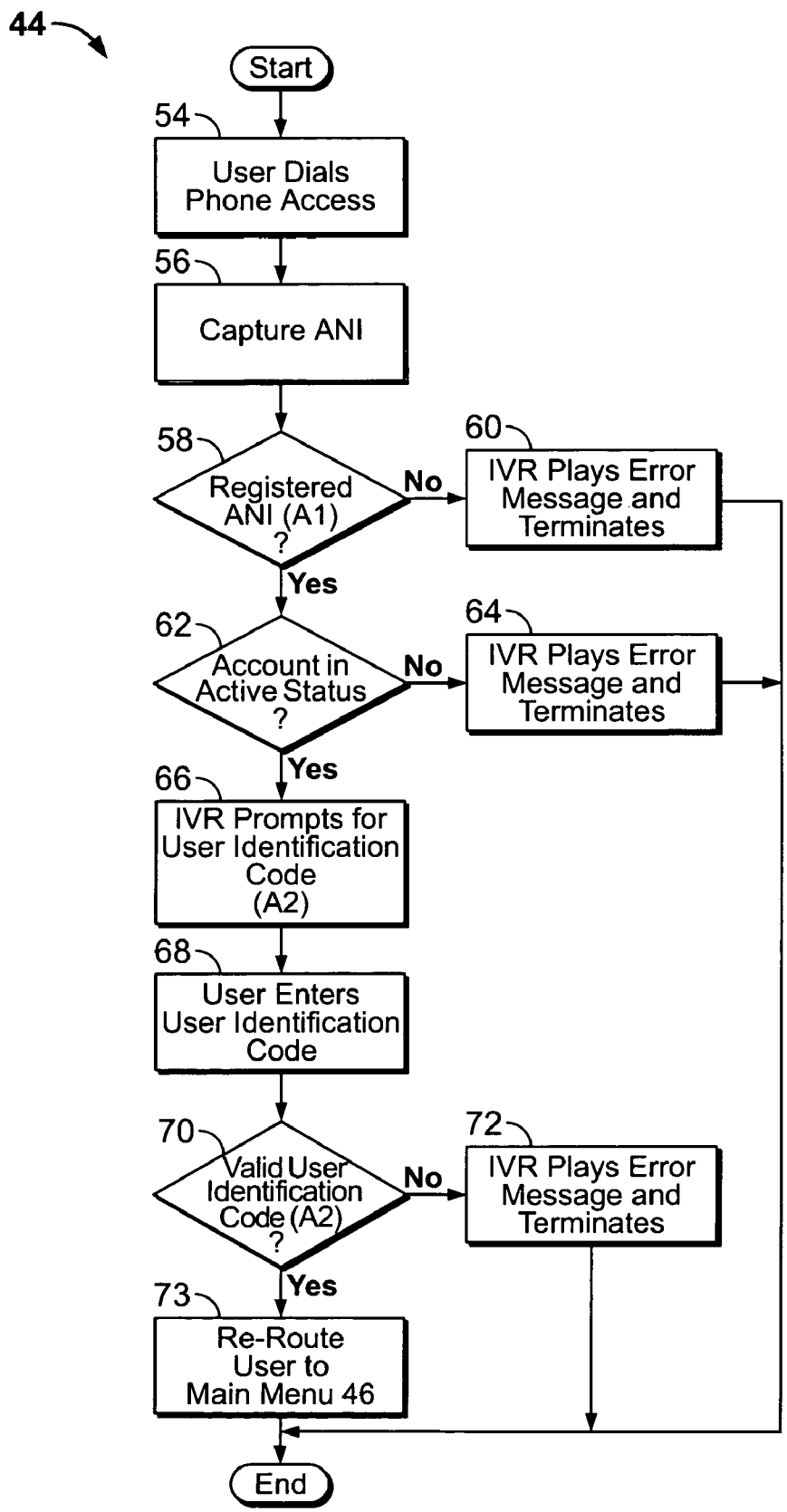
FIG. 4 is a flow chart showing an authentication step illustrated in FIG. 3.
Figure 5:
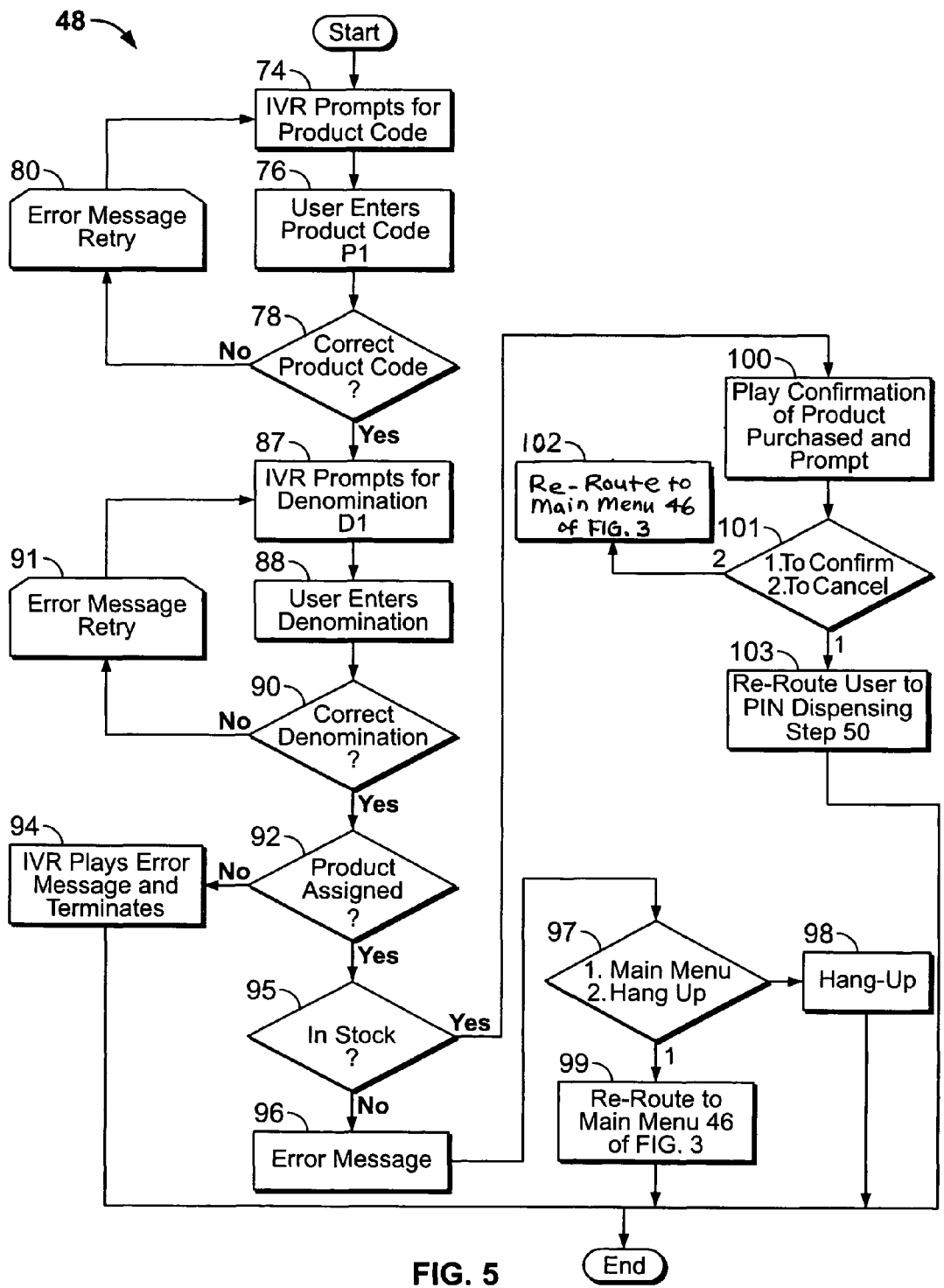
FIG. 5 is a flow chart showing a product selection step illustrated in FIG. 3.

Referring to FIGS. 1-3, when a user 16 accesses the PIN distribution system 10 via, for example, a toll free number, the user's identity is authenticated by the IVR unit 14 before the user 16 is allowed to access the PIN distribution system 10 in a process of authentication (step 44). Once authenticated, the user 16 is prompted via a voice prompt from the IVR unit 14 with the main menu (step 46), wherein the user 16 can choose whether to purchase a PIN or to obtain a report. If the user 16 chooses to purchase a PIN, then the user 16 is prompted to select a PIN product (step 48). The user 16 can then receive the PIN via the IVR unit 14 and the fax machine 32 (step 50). If the user 16 chooses to receive a report (step 52), then a report is generated by the IVR unit 14 and sent to the user 16 by e-mail, which can be accessed by the personal computer 34, or to the fax machine 32. If the user 16 wishes to purchase more PINs or receive reports (step 53), then user is re-routed back to the main menu 46. Otherwise, the call is terminated.

Referring now to FIGS. 1, 2, 3, and 4, the process of authentication (step 44) in accordance with the method of the present invention is presented in greater detail. In step 54, the user 16 dials the telephone number (e.g., "(800) 555-5555") of the PIN distribution system 10 via the telephone 28 or the cell phone 30. In response, the PIN distribution system 10 captures and/or requests certain information relating to the user 16 for authentication purposes by comparing the captured/requested information to information stored in the database server 22, as will be discussed further hereinbelow. More particularly, an automatic number identifier (ANI) "A1" of a telephone line from which the user 16 wishes to make telephone calls to access the PIN distribution system 10 (referred to hereinafter as "the origination ANI") is pre-registered (i.e., pre-stored) in the database server 22 together with a user identification code "A2". While any desired origination telephone number can be pre-registered in the PIN distribution system 10, for security reasons, originating telephone numbers corresponding to telephones or telephone lines which are accessible only by PIN sellers are particularly suitable for registration. The user identification code can be any multiple digit code (e.g., a 4-digit number of the user's choosing) for identifying the user 16 to the PIN distribution system 10.

Referring back to step 54, when the telephone call initiated by the user 16 is connected to the IVR unit 14, the IVR unit 14 captures the automatic number identifier (ANI) of the telephone number or line from which the call originates (see step 56). This step could be carried out using any conventional capture procedure known in the art. The IVR unit 14 consults the database server 22 for an entry corresponding to the captured ANI. At step 58, the database server 22 then determines whether the captured ANI corresponds to the origination ANI "A1" stored in system 10. At step 60, if the user's originating telephone number is not registered, an appropriate error message (e.g., by an audible prompt stating: "YOU ARE NOT A REGISTERED USER. GOOD BYE.") is played by the IVR unit 14, and the call is then terminated. If the captured ANI is registered, then the account corresponding to the ANI "A1" is retrieved from the database server 22 and checked in step 62 to determine whether the account is active (e.g., it has a positive balance; its e-mail or fax settings are set; and its language settings are set, etc.). These parameters are retrieved and stored by the IVR unit 14 for future reference. If it is not active, then an appropriate error message (e.g., an audible message stating: "YOU ACCOUNT IS NOT ACTIVE, GOOD BYE.") is played by the IVR unit 14, and the call is terminated in step 64. If the account is active, then the user 16 is prompted in step 66 to enter a user identification code "A2" after receiving an appropriate greeting message (e.g., an audible message stating: "WELCOME TO LOCUS. ENTER YOUR USER IDENTIFICATION CODE.") generated by the IVR unit 14. The user 16 can then enter the user identification code in step 68. When the code is entered, the IVR unit 14 consults the database server 22 for an entry corresponding to the user identification code "A2". The database server 22 then determines whether the user identification code "A2" is a valid user identification code in step 70. If the user identification code "A2" is determined to be an invalid user identification code (i.e., the entered user identification code does not correspond to any of the user identification codes stored in database server 22), step 72 is invoked, wherein an appropriate error message (e.g., an audible message stating: "YOUR USER IDENTIFICATION CODE IS INVALID. GOOD BYE.") is played by the IVR unit 14, and the call is terminated. If the user identification code "A2" is determined to be a valid user identification code (i.e., the entered user identification code corresponds to a user identification code stored in the database server 22), step 73 is invoked, wherein the user 16 is routed to the main menu 46.

Additionally, the process of authentication (step 44) in accordance with the method of the present invention can be implemented by combining some of the data gathering in steps 56-73 with the invocation of a single SP. In the following example, the IVR unit 14 can invoke a single SP (referred to below as "qvalidaniacs_posa") for gathering and transmitting the ANI of the caller and the user identification code in a single step, as well as checking for one or more result codes. The input and output parameters for such a procedure are listed in Tables 1-3 below.

TABLE 1

Input Parameters for SP "qvalidaniacs_posa"

| Name | Type | Description |
| --- | --- | --- |
| vani | char(10) | ANI of the caller |
| vacscode | char(4) | user identification code "A2" of the user 16 |

TABLE 2

Return Values for SP "qvalidaniacs_posa"

| No | Type | Description |
| --- | --- | --- |
| 1 | int | Result Code |
| 2 | int | Account id of the user |
| 3 | char(1) | 'F': Report To Fax, 'E': Report to Email |
| 4 | char(40) | Email address or Fax number to send report to |
| 5 | char(10) | user id |
| 6 | char(1) | Language |

TABLE 3

Definitions of Result Codes for SP "qvalidaniacs_posa"

| Value | Description |
| --- | --- |
| 0 | Validation passed. |
| −1 | ANI is not registered. |
| −2 | User identification code not found. |
| −3 | Account is not activated |
| −4 | Terminal is registered but not activated. |

Referring to foregoing Tables 1-3, the IVR unit 14 can capture the ANI "A1" of the telephone number or line from which the call originates. The IVR unit 14 can then prompt the user 16 to enter a user identification code "A2" after receiving an appropriate greeting message. The IVR unit 14 can then invoke the SP "qvalidaniacs_posa", which takes as its input the ANI "A1" and user identification code "A2" of the user 16 (see Table 1 above) and can send these input parameters and the name of the SP over the WAN/LAN 20 to the database server 22. In response, the database server 22 can invoke the SP "qvalidaniacs_posa", which can return a message to the IVR unit 14 over the WAN/LAN 20 containing one of the result codes listed in Table 2 and 3 and additional data pertaining to user account information. The data to be returned can include an account id, a flag indicating whether a report is to be sent by fax or by e-mail, the e-mail address or fax number to which reports are to be sent, a user id string, and the language of the user 16. The account id and user id fields can be saved as input parameters for future invocations of other SPs. The IVR unit 14 can then check the return code of the SP and invoke a predetermined set of functions. For instance, if the user 16 has a non-registered ANI, the error message described in steps 60 can be invoked, and the call can be terminated. Similarly, if the user 16 has a non-registered user identification code, then the error message of step 64 can be invoked, and the call can be terminated. Moreover, if the user 16 has a non-active account, then the error message of step 72 can be invoked, and the call can be terminated. Further, if the SP returns "0" for "success", a step similar to step 73 above can be invoked, wherein the user 16 can be routed to the main menu 46. Any desired query format or SP could be implemented for authenticating a user without departing from the scope of the present invention.

Referring now to FIGS. 1, 2, 3 and 5, the process of product selection (step 48) in accordance with the method of the present invention is presented in greater detail. If the user 16 in step 46 (see FIG. 3) chooses either a phone access PIN (e.g., choice 1) or an airtime cell phone PIN (e.g., choice 2), step 74 is invoked, wherein the IVR unit 14 prompts the user 16 via voice prompt to select a PIN product code "P1" (e.g., a 3-digit code such as one of the codes listed in FIG. 11). A PIN product can be the combination of a PIN product code (type of product) combined with a denomination or face value of the product (e.g., $10, $20). The user 16 enters the PIN product code "P1" in step 76. Next, the IVR unit 14 determines in step 78 whether the PIN product code "P1" corresponds to a valid product code by sending the PIN product code "P1" to the database server 22 via the LAN/WAN 20. The database server 22 then looks for an entry corresponding to the PIN product code "P1". If the PIN product code "P1" is determined to be an invalid PIN product code (i.e., the entered PIN product code P1 does not correspond to any PIN product code stored in the database server 22), an appropriate error message (e.g., an audible message stating: "YOUR PRODUCT CODE IS INVALID. PLEASE TRY AGAIN.") is played by the IVR unit 14, and the call is put through a retry scenario 80, which will be discussed in greater detail with respect to FIG. 8.

If the entered PIN product code "P1" corresponds to a valid product code, step 87 is invoked, wherein the IVR unit 14 prompts the user 16 via voice prompt to select a PIN denomination "D1" (e.g., $10, $20, $50, etc.). The user 16 then enters the denomination "D1" at step 88. The IVR unit 14 determines whether the entered denomination "D1" corresponds to a valid denomination in step 90 by sending the entered denomination "D1" to the database server 22 via the LAN/WAN 20. The database server 22 then looks for an entry corresponding to the entered denomination "D1." If the entered denomination "D1" is determined to be an invalid denomination (i.e., the entered denomination "D1" does not correspond to any denomination stored in the database server 22), the retry scenario 91 is invoked, wherein an appropriate error message (e.g., an audible message stating: "YOUR DENOMINATION VALUE IS INVALID. PLEASE TRY AGAIN.") is played by the IVR unit 14, and a prompt is provided for re-entering the denomination "D1" at step 87. If the IVR unit 14 determines that the product corresponding to the PIN product code "P1" and the denomination "D1" has not been assigned in step 92, an appropriate error message (e.g., an audible message stating: "THE PRODUCT CODE HAS NOT BEEN ASSIGNED. GOOD BYE.") is played by the IVR unit 14, and the call is terminated in step 94. Step 92 is performed in cases where the user 16 is assigned with only certain products as represented by specific product codes and denominations (i.e., not all products are available for purchase by the user 16). If all possible products are made available to the user 16, then steps 92, 94 can be omitted.

Assuming that the product corresponding to the PIN product code "P1" and the denomination "D1" has been assigned, step 95 is invoked, wherein the IVR unit 14 determines whether the product (e.g., the product corresponding to the entered PIN product code "P1" and denomination "D1") is in stock by sending the entered PIN product code "P1" and the denomination "D1" to the database server 22 via the LAN/WAN 20. The database server 22 then looks for an entry corresponding to the entered PIN product code "P1" and denomination "D1" combination. If the PIN product code "P1" and denomination "D1" combination selected by the user 16 is not in stock (i.e., the entered PIN product code "P1" and denomination "D1" result in the database server returning a code other than one indicating a "success" to the IVR unit 14), an appropriate error message (e.g., an audible message stating: "WE'RE SORRY. THE PRODUCT IS TEMPORARILY NOT IN STOCK. PLEASE TRY AGAIN LATER.") is played by the IVR unit 14 in step 96. The IVR unit 14 then prompts the user 16 in step 97 to enter either a new PIN product code/denomination pair, or to terminate the call (e.g., by playing an audible message stating: "TO GO BACK TO THE MAIN MENU, PRESS 1. PRESS 2 to HANG-UP."). If the user 16 chooses to terminate the call, then the call is terminated in step 98. If the user 16 wishes to enter a new PIN product code/denomination combination, then at step 99, the call is re-routed by the IVR unit 14 back to the main menu 46 for processing in accordance with the present invention.

Figure 6:
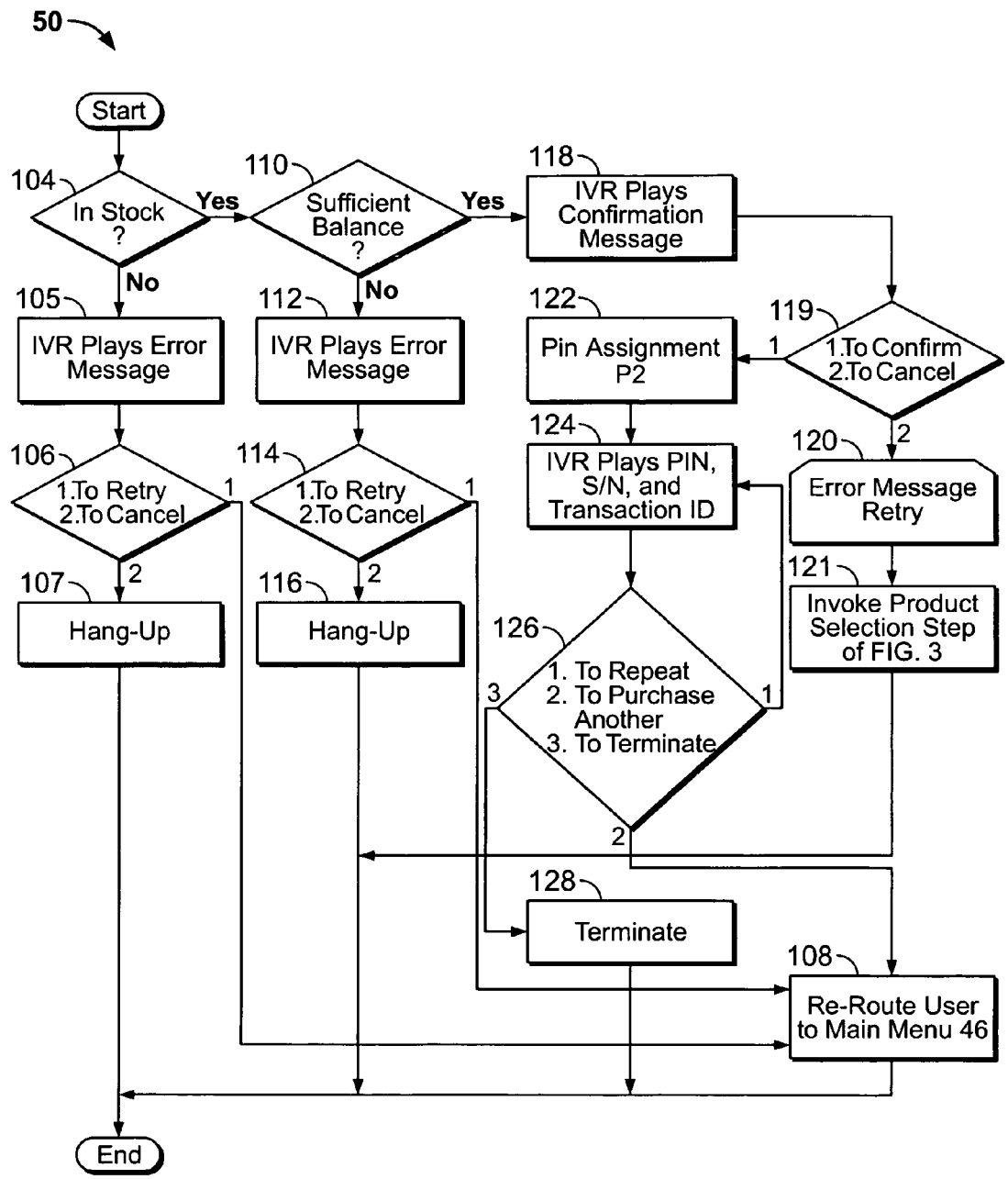
FIG. 6 is a flow chart showing an access code dispensing step illustrated in FIG. 3.

If a determination is made in step 95 that the product is in stock, step 100 is invoked, wherein the IVR unit 14 plays an appropriate confirmation message and prompts the user 16 via voice prompt to confirm that the selection is correct (e.g., by an audible message stating: "YOU HAVE SELECTED XXXX AND $$$. IF CORRECT, PRESS 1. IF NOT, PRESS 2."). If the user 16 selects to cancel by pressing, for instance, "2", the IVR unit 14 re-routes the user 16 to the main menu 46 of FIG. 3 at step 102. If the user 16 confirms by pressing, for instance, "1", then at step 103, the IVR unit 14 re-routes the user 16 to the PIN dispensing step 50 of FIG. 6 to be discussed hereinbelow.

Additionally, the process of product selection (step 48) in accordance with the method of the present invention can be implemented by combining some of the data gathering in steps 74-96 with the invocation of a single SP. In the following example, the IVR unit 14 can invoke a single SP (referred to below as "qvalidprod_posa") for gathering and transmitting the product code and denomination in a single step, as well as checking for one or more result codes. The input and output parameters for such a procedure are listed in Tables 4-6 below.

TABLE 4

Input Parameters for SP "qvalidprod_posa"

| Name | Type | Description |
| --- | --- | --- |
| vaccid | int | account id |
| vpcode | char(3) | 3 digit product code |
| vdenom | char(3) | 3 digit denomination |

TABLE 5

Return Values for SP "qvalidprod_posa"

| No | Type | Description |
| --- | --- | --- |
| 1 | int | Result Code |
| 2 | char(30) | Product Name |

TABLE 6

Definitions of Result Codes for SP "qvalidprod_posa"

| Value | Description |
| --- | --- |
| 0 | Success. |
| −1 | Invalid product code or denomination. |
| −2 | Not assigned to the account. |
| −3 | Product not in stock |

In the implementation of the product selection step (step 48) previously described, the IVR 14 prompts the user 16 for a single piece of information followed by verifying the validity of that information. Referring to foregoing Tables 4-6, in the implementation of product selection step (step 48) using an SP, the IVR unit 14 can prompt the user 16 to enter a product code "P1" and denomination "D1" consecutively without intermediate validation steps. In response, the IVR unit 14 can then invoke the SP "qvalidprod_posa", and the user account id previously determined in the process of authentication of steps 54-73 above, and can send these input parameters and the name of the SP over the WAN/LAN 20 to the database server 22. In response, the database server 22 can invoke the SP "qvalidprod_posa", which returns a message to the IVR unit 14 over the WAN/LAN 20 which can contain one of the result codes listed in Tables 5 and 6 and additional data pertaining to the name of the product that represents the entered product code/denomination combination if the result code is "success" (0). For instance, if a result code is not "success", then the IVR unit 14 can play an appropriate error message and take one of the actions described above. Similarly, if the product code "P1" or denomination "D1" is invalid or has not been assigned to the user's account, then the retry scenario of FIG. 8 can be invoked. Likewise, if the product is not assigned to the user's account, an error message can be played, and the IVR unit 14 can terminates the call. Moreover, if the product is not in stock, the user 16 can be prompted go back to the main menu 46 or hang-up. Steps 100-103 can remain the same.

Referring now to FIGS. 1, 2, 3 and 6, the process of PIN dispensing (step 50) in accordance with the method of the present invention will be discussed below in greater detail. Assuming that the user 16 has indicated that the selected PIN product code "P1" and denomination "D1" is correct, the IVR unit 14 checks again in step 104 to see if the product is in stock. This step is repeated because there is a time lag between the confirmation message at step 100 of FIG. 5 and step 104, and another user may have already purchased the last remaining PIN in that time period. The IVR unit 14 sends the entered PIN product code "P1" and the denomination "D1" to the database server 22 via the LAN/WAN 20. The database server 22 then looks for an entry corresponding to the entered PIN product code "P1" and denomination "D1." If the entered PIN product code "P1" and denomination "D1" is not in stock (i.e., the entered PIN product code "P1" and denomination "D1" results in the database server returning a code other than one indicating a "success" to the IVR unit 14), an appropriate error message (e.g., an audible error message stating: "WE'RE SORRY. THE PRODUCT IS TEMPORARILY NOT IN STOCK. PLEASE TRY AGAIN LATER.") is played by the IVR unit 14 in step 105. The IVR unit 14 then prompts the user 16 in step 106 to enter either a new PIN product code/denomination pair, or to terminate the call (e.g. an audible message stating: "TO GO BACK TO THE MAIN MENU, PRESS 1. PRESS 2 to HANG-UP."). If the user 16 chooses to terminate the call in step 107, the call is terminated. If the user 16 wishes to enter a new PIN product code/denomination combination, then step 108 is invoked, wherein the called is re-routed by the IVR unit 14 back to the main menu 46 of FIG. 3.

If the PIN product code/denomination product is in stock, the IVR unit 14 then determines in step 110 whether the user 16 has a sufficient balance in his or her account to cover the cost of purchasing the PIN product denomination. This is accomplished by sending the user's ANI "A1", account id, product code "P1", and denomination "D1" to the database server 22 via the LAN/WAN 20. The database server 22 then looks for an entry corresponding to the user's account balance (via the ANI, product code "P1", and denomination "D1"). If the user's account balance is insufficient (i.e., the account balance is less than the requested denomination "D1"), an appropriate error message (e.g., an audible message stating: "YOUR BALANCE IS INSUFFICIENT") is played by the IVR unit 14 in step 112. The IVR unit 14 in step 114 then prompts the user 16 to enter a new product code/denomination pair, or to terminate the call (e.g., by playing a message stating: "TO GO BACK TO THE MAIN MENU, PRESS 1. PRESS 2 to HANG-UP."). If the user 16 chooses to terminate the call in step 116, then the call is terminated. If the user 16 wishes to enter a new product code/denomination combination, then step 108 is invoked, wherein the call is re-routed by the IVR unit 14 to the main menu 46 of FIG. 3.

If the user's account balance is sufficient (i.e., the account balance is greater than or equal to the requested denomination "D1"), then step 118 is invoked, wherein a confirmation prompt indicating what the user 16 has purchased is played by the IVR unit 14 (e.g., an audible prompt stating: "YOU HAVE PURCHASED AN XYZ WIRELESS $25 CARD. IF THIS IS CORRECT, PRESS 1, IF NOT, PRESS 2."). In step 119, if the user 14 chooses the prompt which indicates that the information is incorrect, the IVR unit 14 puts the call through the retry scenario 120 of FIG. 8 for re-entering the product code and the denomination at step 121. If the user 14 chooses the prompt which indicates that the information is correct, step 122 is invoked, wherein the IVR unit 14 requests the database server 22 to obtain a PIN "P2" and associate the obtained PIN "P2" with the user's phone user identification code "A2" and originating number "A1". The obtained PIN "P2" can be created dynamically by the system 10, or can be selected from a group of PIN numbers previously stored in the database server 22. After the IVR unit 14 receives the obtained PIN "P2", step 124 is invoked, wherein the IVR unit 14 plays a voice message which indicates the purchased PIN number "P2", a serial number associated with the PIN "P2", and the transaction ID for the call. The IVR unit 14 then prompts the user in step 126 with these options: repeat the message which announces the purchased PIN number, serial number, and transaction ID (choice 1); purchase another PIN (choice 2); or hang-up (choice 3). If the user 16 chooses to hear the PIN information again, the IVR unit 14 repeats steps 124, 126. If the user 16 chooses to purchase another PIN, then step 108 is invoked, wherein the call is re-routed by the IVR unit 14 to the main menu 46 of FIG. 3. If the user 16 chooses to hang-up, then the call is terminated at step 128.

Additionally, the process of PIN dispensing (step 50) in accordance with the method of the present invention can be implemented by combining some of the data gathering in steps 103-116 with the invocation of a single SP. In the following example, the IVR unit 14 can invoke a single SP (referred to below as "salesivr_posa") for gathering and transmitting the product code "P1", denomination "D1", the user account id, the user id, and captured ANI in a single step, as well as checking for one or more result codes. The input and output parameters for such a procedure are listed in Tables 7-9 below.

TABLE 7

Input Parameters for SP "salesivr_posa"

| Name | Type | Description |
|---|---|---|
| vaccid | int | account id |
| vuid | char(10) | user id |
| vpcode | char(3) | 3 digit product code |
| vdenom | char(3) | 3 digit denomination |
| vani | char(10) | ANI number of user |

TABLE 8

Return Values for SP "salesivr_posa"

| No | Type | Description |
|---|---|---|
| 1 | int | Result Code |
| 2 | int | Transaction id |
| 3 | char(18) | serial number |
| 4 | char(16) | PIN number |

TABLE 9

Definitions of Result Codes for SP "salesivr_posa"

| Value | Description |
|---|---|
| >0 | Sales Success. |
| −1 | No discount rate |
| −2 | Not enough funds. |
| −3 | Fail by mutual exclusion |
| −6 | Sold out. |
| −7 | Not enough pins. |
| −11 | Invalid product code or denomination. |

Referring to foregoing Tables 7-9, the IVR unit 14 can invoke the SP "salesivr_posa", which takes as its input the product code "P1", denomination "D1" entered previously in the process of product selection (step 48), the user account id, the user id, and ANI previously determined in the process of authentication (step 44), and send these input parameters and the name of the SP over the WAN/LAN 20 to the database server 22. In response, the database server 22 can invoke the SP "salesivr_posa", which returns a message to the IVR unit 14 over the WAN/LAN 20 containing one of the result codes listed in Tables 8 and 9 and additional data pertaining to the transaction. The data to be returned can include the transaction id, a serial number, and an assigned PIN number if the result code is "success" (0). If a result code is not "success", such as the product code is not in stock (sold out or not enough pins), or the user has an insufficient balance, the IVR unit 14 can play an appropriate error message, and the user 16 can then be prompted to retry or hang up, as was previously described above. Steps 118 to 128 can remain the same.

Referring now to FIGS. 1, 2, 3 and 7, the process of obtaining a report (step 52) in accordance with the method of the present invention is presented in more detail. If the user 16 chooses the "reports" prompt from the main menu 46 (see FIG. 3), then step 130 is invoked, wherein the IVR unit 14 prompts the user 16 with these options: hear the user's available credit (choice 1); receive yesterday's daily transaction report (choice 2); receive today's daily transaction report (choice 3); hear the most recent transaction (choice 4); and receive a product code and denomination chart (choice 5). If the user 16 chooses to hear the available credit (account balance), then step 132 is invoked, wherein the IVR unit 14 sends the request to the database server 22 via the LAN/WAN 20. The database server 22 looks for an entry corresponding to the user's account number (i.e., the account id, which was previously retrieved when the user was being authenticated at step 44). The database server 22 relays the retrieved account balance to the IVR unit 14. The IVR unit 14 then plays a voice message corresponding to the user's available credit in step 134, (e.g., an audible message stating: "YOUR ACCOUNT'S BALANCE IS $$$$."). The IVR unit 14 then prompts the user 16 via voice prompt in step 136 either to return to the main menu 46, or to terminate the call (e.g., by playing a message stating "TO GO BACK TO THE MAIN MENU, PRESS 1. PRESS 2 to HANG-UP."). If the user 16 chooses to terminate the call, then the call is terminated at step 138. If the user 16 wishes to return to the main menu 46, step 139 is invoked, wherein the IVR unit 14 re-routes the call back to the main menu 46.

Additionally, the available credit can be obtained using the same steps 132-139 outlined above, except that the direct database server query of step 132 could be replaced with the invocation of a single SP. In the following example, the IVR unit 14 can invoke a single SP (referred to below as "curbal_posa") for gathering the user's account id and transmitting the user's account balance in a single step. The input and output parameters for such a procedure are listed in Tables 10 and 11 below.

TABLE 10

Input Parameters for SP "curbal_posa"

| Name | Type | Description |
|---|---|---|
| Vaccid | int | account id |

TABLE 11

Return Values for SP "curbal_posa"

| No | Type | Description |
|---|---|---|
| 1 | int | current balance of the account |

Referring to foregoing Tables 10 and 11, the IVR unit 14 can invoke the SP "curbal_posa", which takes as its input the user account id previously determined in the process of authentication (step 44), and send this input parameter and the name of the SP over the WAN/LAN 20 to the database server 22. In response, the database server 22 can invoke the SP "curbal_posa", which returns a message to the IVR unit 14 over the WAN/LAN 20 containing the current account balance of the user 16. Steps 134 to 139 can remain the same.

Referring again to FIGS. 1, 2, 3 and 7, if the user 16 chooses to hear the last transaction in step 130, then step 140 is invoked, wherein the IVR unit 14 retrieves the last transaction from the database server 22. The database server 22 looks for an entry corresponding to the user's account id, user id, and ANI "A1". If it is determined by the database server 22 in step 142 that there was no transaction, or if the database server 22 determines that the entry corresponding to the user's account id was cleared (voided) by the user 16, an appropriate error message (e.g., an audible message stating: "WE'RE SORRY. YOUR LAST TRANSACTION WAS VOIDED.") is played by the IVR unit 14 in step 144. The IVR unit 14 then prompts the user 16 via voice prompt in step 136 either to return to the main menu 46, or to terminate the call (e.g., by playing a message stating: "TO GO BACK TO THE MAIN MENU, PRESS 1. PRESS 2 to HANG-UP."). If the user 16 chooses to terminate the call, then the call is terminated at step 138. If the user wishes to return to the main menu 46, step 139 is invoked, wherein the IVR unit 14 re-routes the call back to the main menu 46.

If it is determined by the database server 22 in step 142 that there was a transaction, the database server 22 then sends the transaction data to the IVR unit 14, which provides the user 16 with a generated voice message in step 146, which includes the data of the transaction (e.g., an audible message stating: "YOUR LAST TRANSACTION WAS 10:40 AM, FRIDAY, MAY 16, XYZ WIRELESS CARD, $25. THE PIN NUMBER WAS XXX, THE SERIAL NUMBER WAS YYY. THE TRANSACTION ID WAS ZZZ."). The IVR unit 14 then prompts the user in step 147 with these options: repeat the last transaction message (choice 1); purchase another PIN (choice 2); or terminate the call (choice 3). If the user 16 chooses to hear the last transaction repeated, then the IVR unit 14 puts the call through the retry scenario 148, in which step 146 is repeated. If the user 16 chooses to purchase another PIN, then step 139 is invoked, wherein the call is re-routed by the IVR unit 14 to the main menu 46 of FIG. 3. If the user 16 chooses to hang-up, then the call is terminated at step 138.

Additionally, a report concerning the last transaction can be obtained using the same steps 140-148 outlined above, except that the direct database server query of step 140 could be replaced with the invocation of a single SP. In the following example, the IVR unit 14 can invoke a single SP (referred to below as "ltransivr_posa") for gathering the user's account id, ANI, and user id and transmitting the user's last transaction information as well as checking for one or more result codes in a single step. The input and output parameters for such a procedure are listed in Tables 12-14 below.

TABLE 12

Input Parameters for SP "ltransivr_posa"

| Name | Type | Description |
|---|---|---|
| Vaccid | int | account id |
| Vtmid | char(20) | terminal id (ANI) |
| Vuid | char(10) | user id |

TABLE 13

Return Values for SP "ltransivr_posa"

| No | Type | Description |
|---|---|---|
| 1 | int | Transaction id (Negative if error) |
| 2 | char(30) | Product name |
| 3 | int | Denomination |
| 4 | char(18) | Serial Number of PIN |
| 5 | char(16) | PIN |
| 6 | datetime | transaction time |

TABLE 14

Definitions of Result Codes for SP "ltransivr_posa"

| Value | Description |
|---|---|
| 0 | Success. |
| −1 | Last transaction is voided |
| −2 | No valid transaction is found. |
| −3 | PIN not found |

Referring to foregoing Tables 12-14, the IVR unit 14 can invoke the SP "transivr_posa", which takes as its input the user account id, the user id, and the ANI previously determined in the process of authentication (step 44), and send these input parameters and the name of the SP over the WAN/LAN 20 to the database server 22. In response, the database server 22 can invoke the SP "ltransivr_posa", which returns a message to the IVR unit 14 over the WAN/LAN 20 containing one of the result codes listed in Tables 13 and 14 and additional data pertaining to the report. The data to be returned can include the Transaction id, the Product name, Denomination, Serial Number of the PIN, the PIN itself (i.e., access code), and the transaction time if the result code is "success" (0). If a result code is not "success", such as the last transaction was voided, no valid transaction was found, or no PIN was found (step 142), the IVR unit 14 can play an appropriate error message (step 144), and user 16 can then be prompted to retry or hang up, as was previously described above. Steps 146-148 can remain the same.

Referring back to step 130, if the user 16 chooses to receive either yesterday's daily transaction report (choice 2), today's daily transaction report (choice 3), or a list of available product codes and denomination assigned to that user (choice 5), then step 149 is invoked, wherein the IVR unit 14 plays an appropriate confirmation message (e.g., an audible message stating: "YOUR DAILY TRANSACTION REPORT WILL BE SENT SHORTLY" (choice 1 or 2), or "THE LIST OF AVAILABLE PRODUCTS AND PRODUCT CODES WILL BE SENT SHORTLY" (choice 5)). In step 150, the IVR unit 14 retrieves requested report from the database server 22. For choice 1 or 2, the database server 22 looks for an entry corresponding to the user's account id and the request type "yesterday" or "today". For choice 5, a global request of the entire list of products, product codes, and denominations assigned to the user 16 is requested from the database server 22. The information requested is sent by the database server 22 to the IVR unit 14 via the LAN/WAN 20. The IVR unit 14 then formats (step 152) and transmits (step 154) the report to the user's e-mail address or fax number (during registration of the user's account, the user 16 chooses to send a report by e-mail or facsimile and the e-mail address/fax number to which to send a report). The IVR unit 14 then prompts the user 16 via voice prompt in step 136 either to return to the main menu 46, or to terminate the call (e.g., by playing a message stating: "TO GO BACK TO THE MAIN MENU, PRESS 1. PRESS 2 to HANG-UP."). If the user 16 chooses to terminate the call, then the call is terminated at step 138. If the user wishes to return to the main menu 46, step 139 is invoked, wherein the IVR unit 14 re-routes the call back to the main menu 46 of FIG. 3.

Additionally, the user 16 can choose to receive either yesterday's daily transaction report (choice 2), today's daily transaction report (choice 3), or a list of available product codes and denomination assigned to that user (choice 5), using the same steps 149-154 outlined above, except that the direct database server queries of step 149 can be replaced with the invocation of a single SP. In the following example, the IVR unit 14 can invoke a single SP (referred to below as "dailyreport_posa") for choices 1 and 2, and a single SP (referred to below as "assignedprod_posa") for choice 5, as described in Tables 15-19 below.

TABLE 15

Input Parameters for SP "dailyreport_posa"

| Name | Type | Description |
| --- | --- | --- |
| vdateidx | int | date to be reported (0 for today, −1: yesterday) |
| vaccid | int | account id |

TABLE 16

Return Values for SP "dailyreport_posa"

| No | Type | Description |
| --- | --- | --- |
| 1 | char(100) | a line of report. |

TABLE 17

Columns in a line of report

| No | Description |
| --- | --- |
| 1 | Transaction time |
| 2 | transaction id |
| 3 | User id |
| 4 | ANI |
| 5 | Product name |
| 6 | Face Value |
| 7 | Serial number of PIN |
| 8 | Quantity |
| 9 | Amount |
| 10 | Retail commission |

TABLE 18

Input Parameters for SP "assignedprod_posa"

| Name | Type | Description |
| --- | --- | --- |
| vaccid | int | account id |

TABLE 19

Return Values for SP "assignedprod_posa"

| No | Type | Description |
| --- | --- | --- |
| 1 | char(30) | Product Name |
| 2 | char(3) | Product code |
| 3 | int | Face value |

Figure 7:
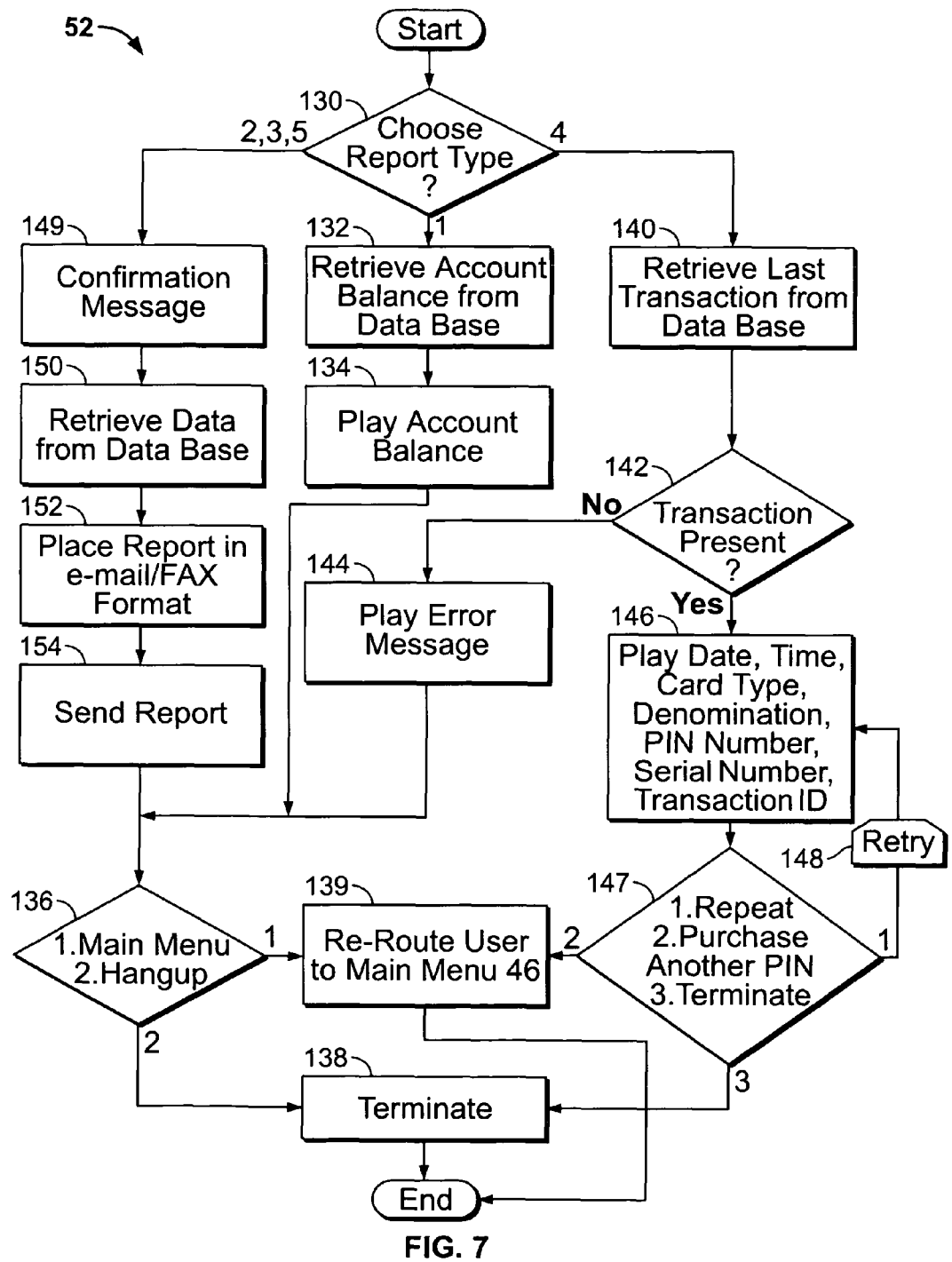
FIG. 7 is a flow chart showing a report generation step illustrated in FIG. 3.

Referring to foregoing Tables 15-17 for a user 16 selecting Choice 2 or 3 in step 130 of FIG. 7, the IVR unit 14 can invoke the SP "dailyreport_posa", which takes as its input the date to be reported ("0" for today, "−1" for yesterday) and the user account id determined in the process of authentication (step 44), and send these input parameters and the name of the SP over the WAN/LAN 20 to the database server 22. In response, the database server 22 can invoke the SP "dailyreport_posa", which returns a message to the IVR unit 14 over the WAN/LAN 20 containing data pertaining to the report as described in Tables 16 and 17. Steps 149-154 can remain the same.

Referring to foregoing Tables 18 and 19 for a user 16 selecting Choice 5 in step 130 of FIG. 7, the IVR unit 14 can invoke the SP "assignedprod_posa", which takes as its input the user account id determined in the process of authentication (step 44), and send this input parameter and the name of the SP over the WAN/LAN 20 to the database server 22. In response, the database server 22 can invoke the SP "assignedprod_posa", which returns a message to the IVR unit 14 over the WAN/LAN 20 containing the product name, product code, and face value of available products assigned to the user 16 as described in Table 19. Steps 149-154 can remain the same.

Referring now to FIG. 8, the retry scenario (step 80) is employed at various points by the PIN distribution system 10 as an alternative to terminating the call. In step 82, when an error condition has occurred (e.g., an invalid PIN product code), after an appropriate error message is played by the IVR unit 14, the user is routed back to a data entry step (e.g., a prompt for entering the PIN product code). The prompt and validation step are retried in step 84 for a predetermined maximum number of tries until a threshold number of times (e.g., two times). If the error condition persists (e.g., the user 16 is still unable to provide the IVR unit 14 with valid requested data), then the call is routed to a live operator (e.g., the customer service representative 18) in step 86 for manual data entry.

Referring now to FIGS. 9 and 10, sample transaction reports for the current day's transactions are depicted for a report received by e-mail and for a report received by facsimile, respectively. Except for the header information, which is typical for an e-mail or facsimile transmission, respectively, the fields shown correspond to the individual and total number of transactions processed. These fields include a date field 156, a time of transaction field 158, a transaction ID field 160, a Cashier (user ID) field 162, a terminal field 164 (origination number "A1"), the product name 166 in text corresponding to the numerical product code "P1" entered at step 76, a face value field 168 corresponding to the denomination "D1" entered at step 88, a quantity field 170 corresponding to the number of products of the same product code and denomination purchased, a total amount field 172 in dollars, and a commission field 174. The commission field 174 indicates the commission in dollars paid to the seller (the user 16) for selling the particular product (product name/face value combination). Other fields of information could be included in the report, as desired.

Referring now to FIG. 11, a sample report of all available products and product codes is depicted for a report received by e-mail. The report, when received by facsimile, differs only in the header (not shown). The fields shown include a product name field 176, a product code field 178, and a face value (denomination) field 180. Each row can be sorted, for example, in increasing numeric order, starting with the product code field 178 in various denominations 180. Other fields of information could be included in the report, as desired.

The various processes of the present invention discussed above can be provided as computer programs that can be resident in one or more devices, such as, without limitation, the IVR unit 14, the database server 22, the e-mail server 24, or other components of the PIN distribution system 10.

It should be appreciated that the present invention provides numerous advantages over the conventional PIN distributing processes and systems discussed above. For instance, because the PIN distribution system 10 allows its users to purchase PINs without the need for a dedicated terminal or special computer and other telecommunication equipment, it provides a user-friendly system for purchasing PIN-based products. In addition, since the purchasing of PINs is made from telephones which have an associated registered telephone number and user identification code, security is not compromised. Moreover, because purchasing PINs is done "on-the-fly", inventory costs are kept at a minimum. PIN products associated with the purchased PINs (i.e., access codes), such as pre-paid telephone calling cards, rarely, if ever, run out of stock.

The present invention can have numerous modifications and variations. For instance, while ANIs are preferred, other identifying mechanisms, systems, numbers or codes can be used in connection with the PIN distribution system 10 for capturing or identifying telephone numbers or lines from which calls are made. Moreover, the balance for purchasing PINs can be replenished through a computer network and the IVR unit 14 located at the PIN distribution system website location or customer service location, or by way of credit card charges (e.g., automatic credit card replenishment when the balance falls below a predetermined value). The PIN distribution system 10 can also be adapted for use in connection with telecommunication networks other than the PSTN 12 (e.g., the Internet). Further, the PIN distribution system 10 can be modified in numerous ways. For example, a single server, or any desired combination thereof, could be configured to provide the functionality of the present invention.

The PIN distribution system 10 can be provided with an account management website where the user 16 can change certain account preferences. The website can reside on a separate server, which is connected to the database server 22 via the LAN/WAN 20 (not shown). The user 16 can be presented with a login/password screen (not shown), from which the user 16 can also set and view preferences, such as the originating automatic number identifier "A1", the user identification code "A2", the mailing address of the account, the receiving of reports via fix or e-mail, the setting of the fax telephone number or e-mail address, language preference, changing accounting information such as bank name, routing number, account number, and viewing the current account balance, etc.

In other embodiments of the present invention, steps can be taken to protect against theft of PINs. When theft of a PIN occurs, the owner of the PIN distribution system 10 may not immediately cancel the PINs that have been stolen, since these PINs may be controlled by the PIN vendor (i.e., an entity other than the owner of the PIN distribution system 10). To combat this problem, the owner of the PIN distribution system 10 can associate a PIN with a transaction ID and store this information in the database server 22. Only the transaction ID is distributed to the user 16. The user 16 can use the transaction ID as a de facto PIN, since it would be valid anywhere a PIN is valid. In such circumstances, if the transaction ID is stolen, the owner of the PIN distribution system 10 can cancel the transaction ID associated with the PIN, so there is no theft of the PIN.

It will be understood that the embodiments described herein are merely exemplary and that a person skilled in the art may make many variations and modifications without departing from the spirit and scope of the invention. All such variations and modifications, including those described above, are intended to be included within the scope of the present invention as defined in the appended claims.

We claim:

1. A method for distributing an access code for using a pre-paid product, comprising the steps of:
   connecting a telephone call originating from a telephone to an interactive voice response system of a transaction processing system, the telephone call being initiated by a caller from the telephone;
   receiving, at the interactive voice response system, a request from the caller for an access code associated with a pre-selected product;
   obtaining an access code from the transaction processing system in response to the request; and
   playing an audible message including the obtained access code to the caller during the telephone call, whereby the caller receives the obtained access code using solely the telephone and without the use of any specialized point-of-sale terminal.

2. The method of claim 1, further including the step of verifying whether the caller is authorized to access the transaction processing system.

3. The method of claim 2, wherein said verifying step includes the step of capturing an automatic number identifier corresponding to a telephone line from which the telephone call originates.

4. The method of claim 3, wherein said verifying step includes the step of prompting the caller to provide a user identification code.

5. The method of claim 4, wherein said verifying step includes the step of comparing the user identification code provided by the caller to at least one of a plurality of user identification codes stored in the transaction processing system.

6. The method of claim 5, wherein said verifying step includes the step of comparing the captured automatic number identifier to at least one of a plurality of automatic number identifiers stored in the transaction processing system.

7. The method of claim 6, wherein said receiving step is performed if the user identification code provided by the caller matches with one of the plurality of user identification codes and if the captured automatic number identifier matches with one of the plurality of automatic number identifiers.

8. The method of claim 1, wherein the interactive voice response system is configured so as to process the request received from the caller during the performance of said receiving step.

9. The method of claim 8, wherein the voice response system is configured to communicate with the caller so as to receive the request.

10. The method of claim 9, further comprising the step of prompting the caller to enter a product code and a denomination corresponding to one of a plurality of telecommunications products, the plurality of telecommunication products including at least one pre-paid calling card.

11. The method of claim 10, further comprising the step of comparing the entered product code to at least one of a plurality of product codes stored in the transaction processing system.

12. The method of claim 11, further comprising the step of comparing the entered denomination to at least one of a plurality of denominations stored in the transaction processing system.

13. The method of claim 12, wherein said obtaining step is performed if the entered product code matches with one of the plurality of product codes and the entered denomination matches with one of the plurality of denominations.

14. The method of claim 1, further comprising the step of sending to the caller a report containing information which relates to a transaction involving the transmitted access code.

15. The method of claim 14, wherein the report is sent to the caller via one of a plurality of communication means.

16. The method of claim 15, wherein the plurality of communication means includes a facsimile communication, an e-mail communication and an audible message.

17. The method of claim 16, wherein said sending step is performed by sending a facsimile communication to a facsimile telephone number stored in the transaction processing system.

18. The method of claim 16, wherein said sending step is performed by sending an e-mail communication to an e-mail address stored in the transaction processing system.

19. The method of claim 16, wherein said sending step is performed by playing an audible message to the caller during the telephone call.

20. The method of claim 16, wherein the report includes a product code and a denomination associated with the transmitted access code.

21. A system for distributing an access code for using a pre-paid product, comprising a transaction processing system having an interactive voice response system and a database, said database including a plurality of access codes, each of which is associated with a pre-selected product, said transaction processing system being operative to:

be connected to a telephone call originating from a telephone, the telephone call being initiated by a caller from the telephone and being connected to said voice response system of said transaction processing system;

receive, at said voice response system, a request from the caller for an access code associated with a pre-selected product;

obtain an access code from said database in response to the request; and play an audible message including the obtained access code to the caller during the telephone call, whereby the caller receives the obtained access code using solely the telephone and without the use of any specialized point-of-sale terminal.

22. The system of claim 21, wherein said voice response system is operative to prompt the caller to enter the request and to receive the request.

23. The system of claim 22, wherein said voice response system is operative to prompt the caller to specify a product code and a denomination corresponding to the telecommunications product.

24. The system of claim 23, wherein said voice response system is operative to select one of the access codes from said database in response to receiving the product code and denomination specified by the caller.

* * * * *